May 4, 1954  J. BAGWELL-PUREFOY ET AL  2,677,308
APPARATUS FOR THREAD MILLING
Filed May 17, 1950  2 Sheets-Sheet 1
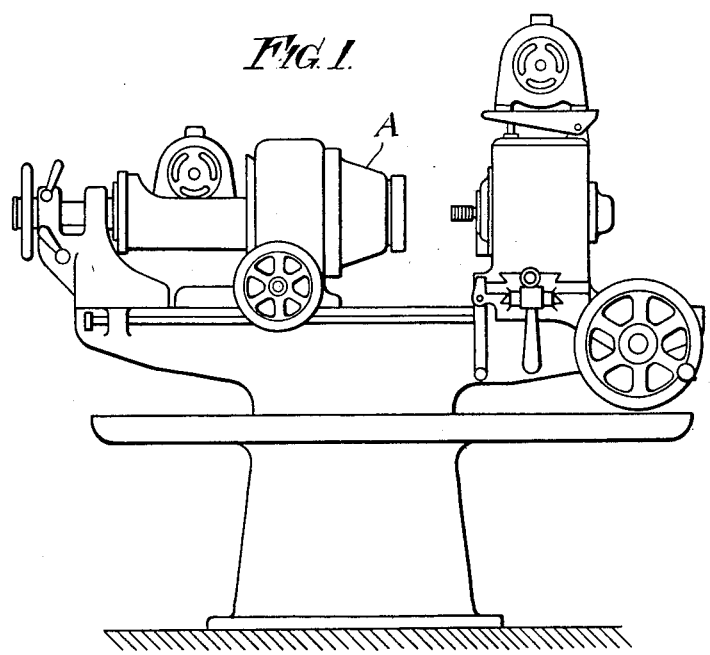
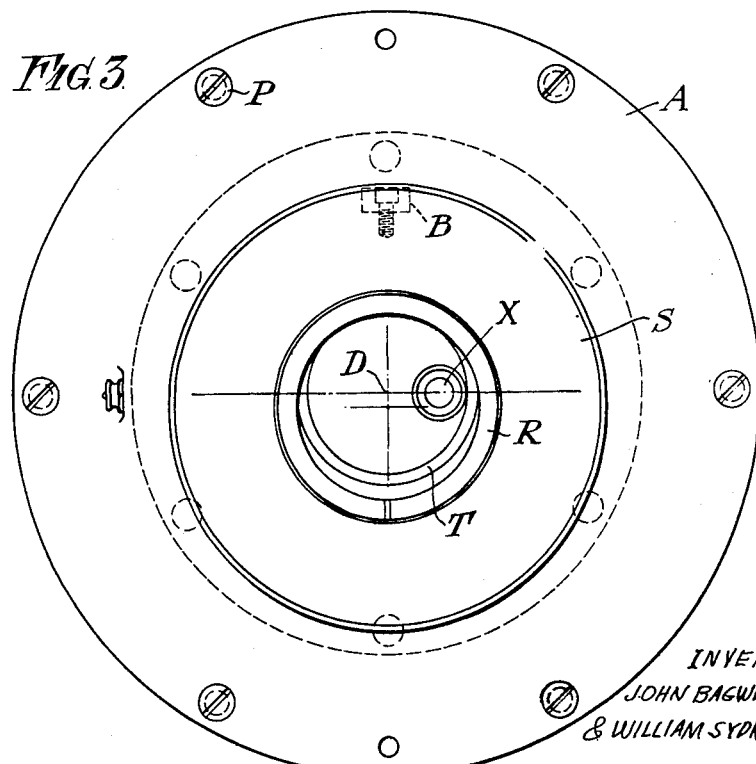
INVENTORS:
JOHN BAGWELL-PUREFOY
& WILLIAM SYDNEY COOPER
BY: W.B. Harpman
ATTORNEY

INVENTORS:
JOHN BAGWELL-PUREFOY
& WILLIAM SYDNEY COOPER

BY W.B. Harpman
ATTORNEY

Patented May 4, 1954

2,677,308

UNITED STATES PATENT OFFICE 2,677,308

APPARATUS FOR THREAD MILLING

John Bagwell-Purefoy and William Sydney Cooper, Cobham, England

Application May 17, 1950, Serial No. 162,514

1 Claim. (Cl. 90—11.4)

The present invention relates to thread cutting and more particularly to taper thread cutting.

Heretofore it has been the practice when cutting a thread on a taper to do this on a lathe by moving the tail-stock off centre and adjusting the tool to cut the desired thread, or by using a taper-turning attachment. Alternatively when a taper thread has been milled it has been the practice to offset the work piece to produce the taper thread. However in both these cases constant re-adjustment has to be made and even so the depth and pitch are frequently found to vary producing a defective thread in which the male and female threads so cut do not marry perfectly; in fact when taper threads cut in this manner are used on pipe joints, a good seal is often not obtained.

An object of the present invention is to provide means whereby an accurate taper thread may be cut so that on a pipe joint a true seal is obtained which if sufficiently tightened, will withstand any pressure up to the mechanical limits of the pipe.

It is a further object of the invention to obtain an improved surface finish to a taper thread.

Broadly, the invention comprises milling a thread on a tapered surface of a work piece with a multitooth cutter by rotating the work piece about its axis while moving the workpiece and the cutter relative to each other along a straight line, the axis of rotation of the work piece being inclined to the line of movement at an angle corresponding to the angle of the tapered surface with respect to the axis of the workpiece and positioning the cutter so that a plane including said straight line the axis of the workpiece and the axis of the cutter will intersect the tapered surface of the workpiece along a line parallel to the said direction of movement.

The invention has particular application to the cutting of accurate taper threads for use in making fluid tight joints and for this purpose it is preferred to employ a cutter of parallel form.

An apparatus according to the invention includes an annular member adapted for axial movement and having a bore inclined to the axis of movement at an angle corresponding to the taper of a work-piece on which a thread is to be cut, and a sleeve rotatably carried in said bore and provided with means for receiving and holding the workpiece.

In the accompanying drawings illustrating one form of machine constructed in accordance with the present invention:

Figure 1 is an elevation of a thread milling machine according to the invention.

Figure 3 is an end view of the part shown in Figure 2.

Figure 2:
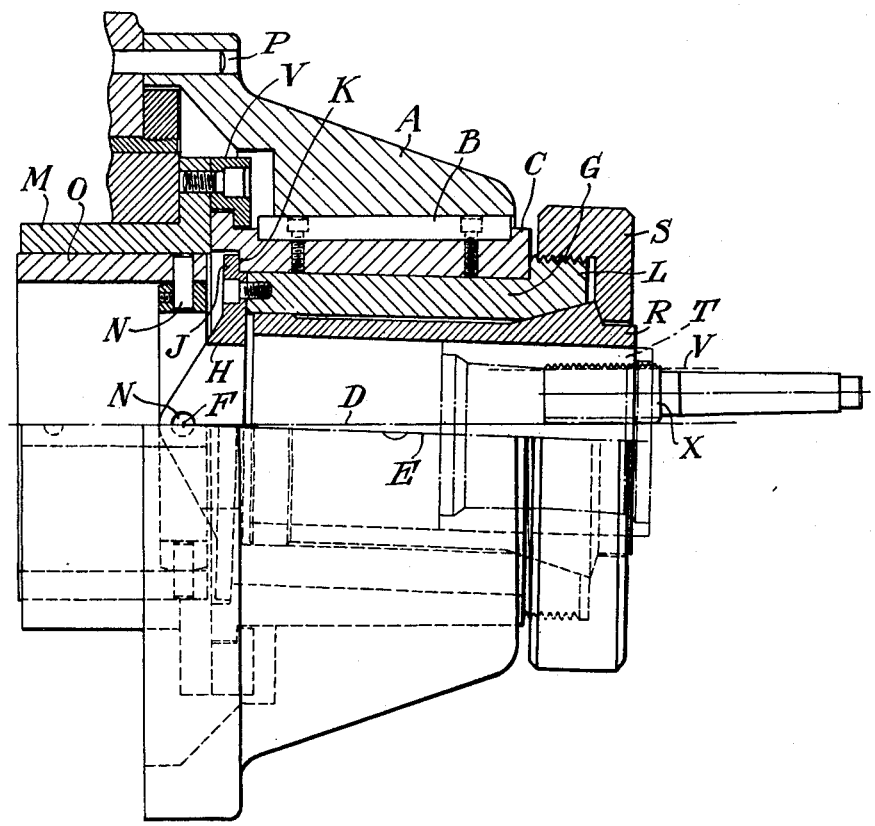
Figure 2 is a part sectional plan view of part of the machine drawn to a larger scale.

In the form of the invention shown on the drawings a thread milling machine is used having an annular housing A which is adapted to be fixed to the end of the machine as shown in Figure 1 after the normal chuck or collet for holding a workpiece has been removed from the machine. The annular housing A is attached to the machine by means of studs passed through holes P formed around a flange of the housing.

This annular housing A is provided with a keyway B by means of which there slides axially and concentrically with the axis of the machine an annular member C the bore of which is inclined to the axis D of the machine at an angle corresponding to the taper upon which the thread is to be cut. The axis E of this inclined bore intersects the axis D of the machine at a point F situated in the transverse plane in which the drive is transmitted from the shaft of the machine to a sleeve G which forms a rotating fit within the annular member C and which is permitted to rotate within said annular member but is so connected thereto that the two are constrained to move together axially along the axis D.

The internal and external faces of the sleeve G are concentric so that the sleeve is concentric with the inclined bore in the annular member C and the axis of the sleeve coincides with the axis E of the above. The rear end of the sleeve G carries a coupling plate H which has a circumferential flange or shoulder J forming a bearing surface against a corresponding shoulder K on the annular member C and the front end of the sleeve is also provided with a circumferential flange L which also forms a bearing surface against the front end face of said annular member.

The coupling plate H is connected to the driving sleeve M of the machine by means of a universal joint N. The transverse plane in which this joint moves cuts the axis of the machine D at the point F where the axis E of the inclined bore of the annular member C intersects said axis D of the machine. The universal joint is itself carried in a subsidiary sleeve O which is free to slide axially in the driving sleeve so that should any oscillation occur, the subsidiary sleeve O is free to move backwards and forwards in the main driving sleeve.

The normal drive of the machine is employed so that as the sleeve G is rotated by the shaft it is also advanced axially along the axis D since the annular member C is pressed forward by the driving sleeve M of the machine effecting axial movement to correspond with the pitch of the thread desired. The annular member C is rotatably secured to the sleeve M by means of a ring V which is free to rotate around the member C. The sleeve G is provided with a collet R and collet nut S for gripping the workpiece.

When the workpiece is inserted into the collet the axis of the workpiece which for example may be a union for tapered pipe joints as shown in dotted lines at T, will coincide with the axis E of the inclined bore of the annular member C the angle of inclination of which is made to correspond to that of the taper on the bore of the union so that a line along the tapered surface of the union and lever with the centre line of the housing A as indicated at V will be parallel with the axis of the housing. It is along this line that the multi-tooth cutter shown at X cuts the thread in the normal manner. With a thread cut on the tapered inner surface of a union in this way the thread is substantially true throughout its length and will match a corresponding thread similarly cut upon the outer surface of the tapered end of a male member.

Most standard threads for pipe joints are such that the flanks of the threads cut upon the pipe and the inner face of the union are equally inclined to the axis of the pipe and to obtain this the cutter blades are themselves cut at such an angle as to produce this effect.

Should it be desired for the flanks of the cut threads to incline equally towards the line of the taper then an ordinary multi-blade miller can be used in which the flanks of the teeth subtend equal angles with the axis of the cutter.

What we claim is:

A thread milling machine for milling threads on a tapered surface of a workpiece comprising a cylindrical multi-tooth thread cutter, means for rotating said cutter, means for engaging the cutter with the said tapered surface, and means for rotating the workpiece with its axis inclined to the axis of the cutter at an angle corresponding to the angle of taper of the tapered surface, the said last mentioned means comprising an annular housing fixedly secured to a stationary portion of the machine and having an axial bore extending in the direction of the longitudinal axis of the cutter, an annular member slidably supported in said housing for limited axial movement with respect thereto, the said annular member having a bore inclined with respect to the axis of the housing at an angle corresponding to the angle of taper of the said surface, a workpiece supporting sleeve rotatably supported in the bore of said annular member and constrained against movement longitudinally thereof, means for releasably securing the workpiece in the said supporting sleeve, a hollow drive shaft on said machine, a subsidiary sleeve slidable longitudinally within said drive shaft and constrained to rotate therewith and operatively connected to said supporting sleeve for effecting rotation thereof, by means of a universal joint the axis of which lies in a transverse plane passing through the point of intersection of the axis of the said supporting sleeve and the axis of the housing.

References Cited in the file of this patent

UNITED STATES PATENTS

| Number | Name | Date |
| --- | --- | --- |
| 331,167 | Taylor | Nov. 24, 1885 |
| 437,713 | Newberry | Oct. 7, 1890 |
| 913,312 | Sellew | Feb. 23, 1909 |
| 1,033,142 | Wright | July 23, 1912 |
| 1,148,065 | Warren | July 27, 1915 |
| 1,343,503 | Hall | June 15, 1920 |
| 1,883,995 | Lees | Oct. 25, 1932 |
| 2,459,416 | Davis | Jan. 18, 1949 |
| 2,516,731 | Swift | July 25, 1950 |
| 2,566,116 | Chang | Aug. 28, 1951 |

FOREIGN PATENTS

| Number | Country | Date |
| --- | --- | --- |
| 351,757 | Great Britain | July 2, 1931 |